May 21, 1946.         J. J. SAIA         2,400,655
GUIDE FOR PUBLIC SAFETY OF VEHICLES AND PEDESTRIANS
Filed March 20, 1941         4 Sheets-Sheet 1

Inventor,
John J. Saia
By Sterling P. Buck,
Attorney.

May 21, 1946. J. J. SAIA 2,400,655
GUIDE FOR PUBLIC SAFETY OF VEHICLES AND PEDESTRIANS
Filed March 20, 1941. 4 Sheets-Sheet 2
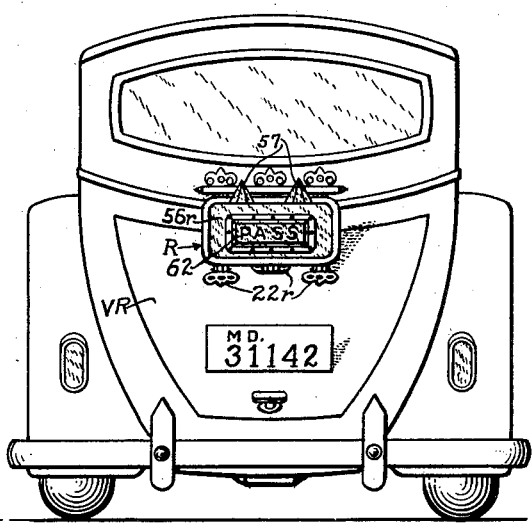
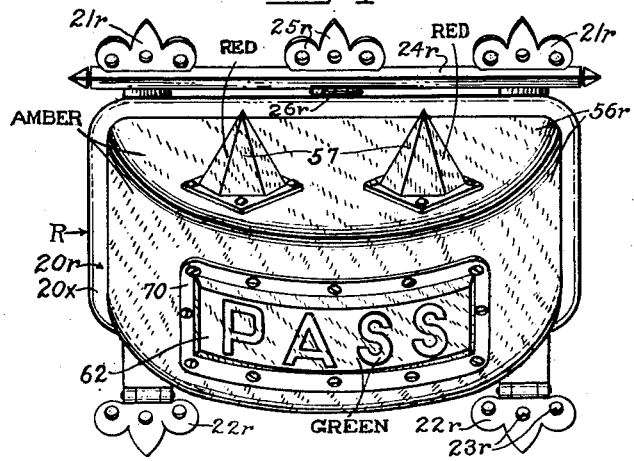

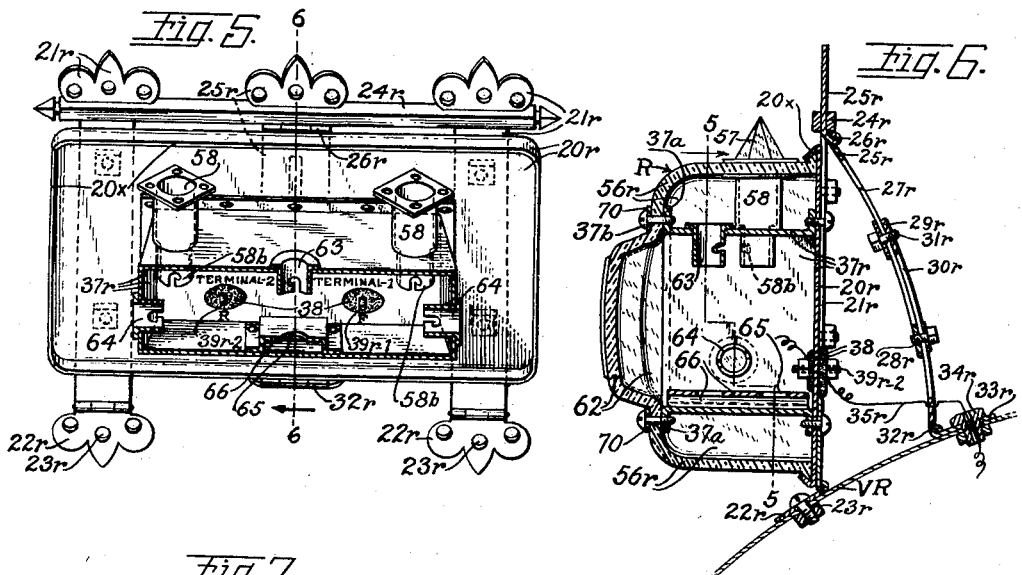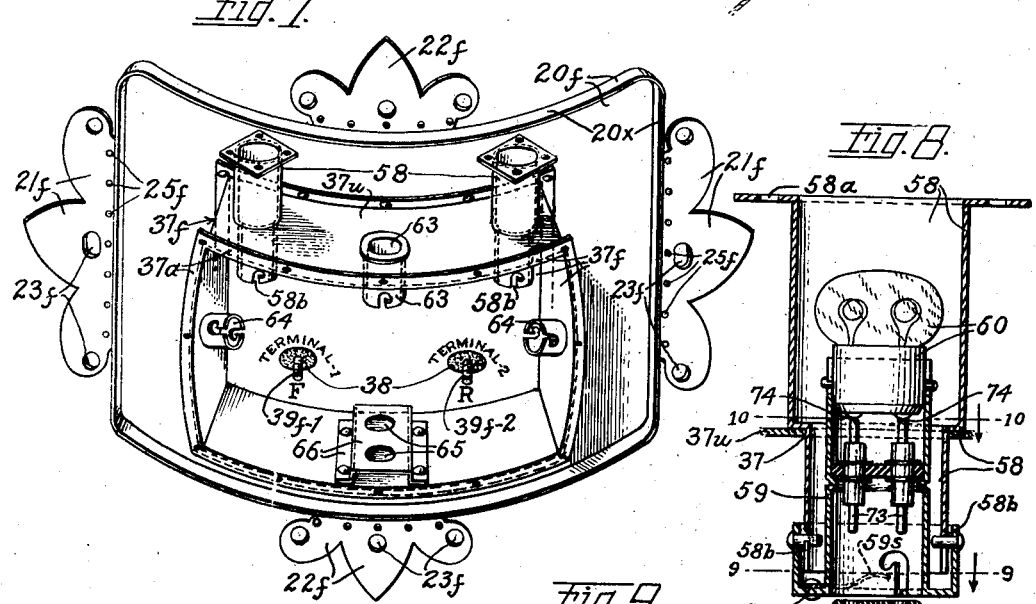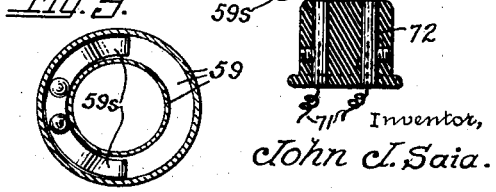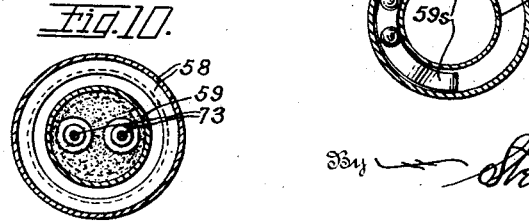

May 21, 1946.  J. J. SAIA  2,400,655
GUIDE FOR PUBLIC SAFETY OF VEHICLES AND PEDESTRIANS
Filed March 20, 1941    4 Sheets-Sheet 4
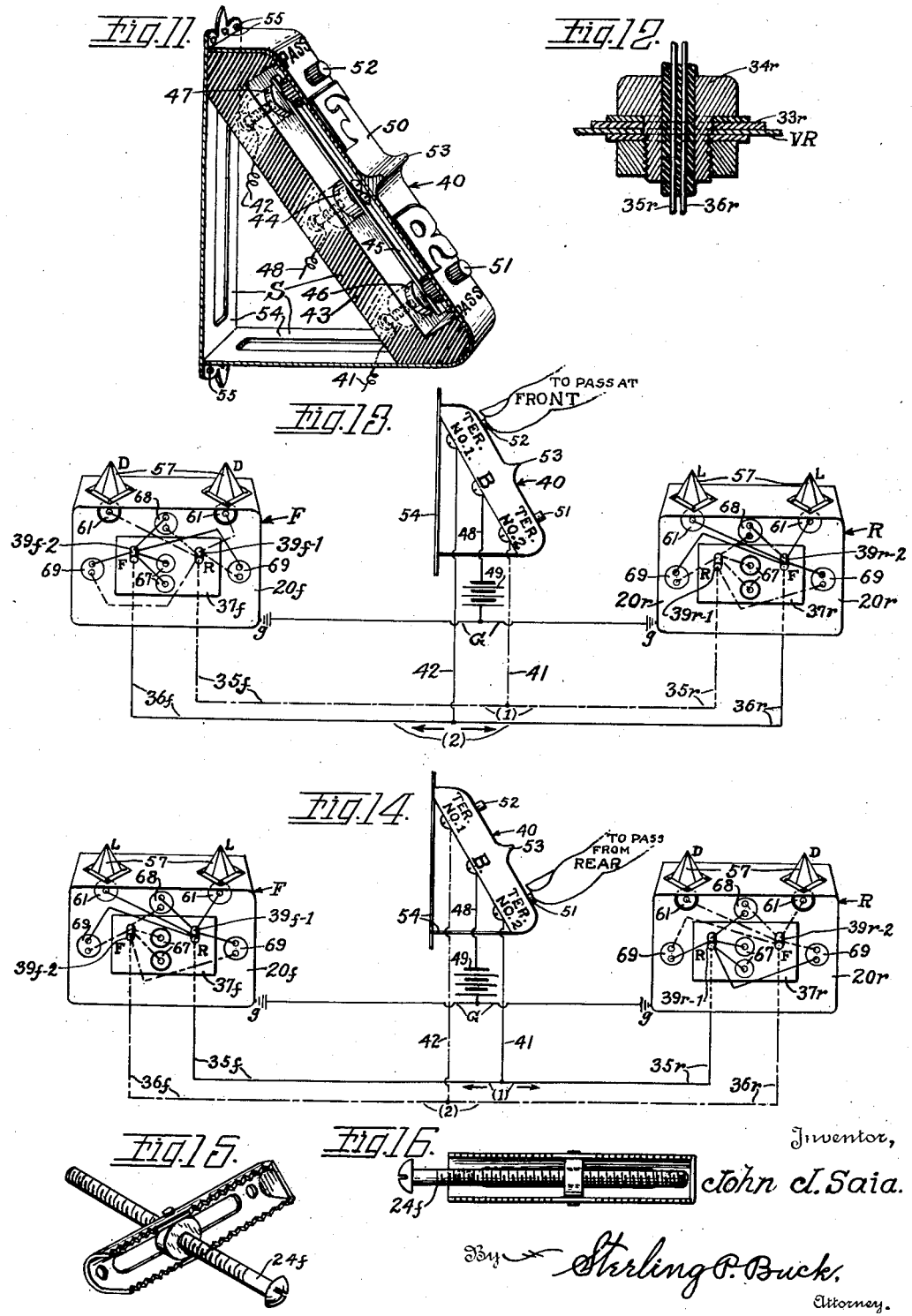
Inventor,
John J. Saia.
By Sterling P. Buck,
Attorney.

Patented May 21, 1946

2,400,655

UNITED STATES PATENT OFFICE 2,400,655

GUIDE FOR PUBLIC SAFETY OF VEHICLES AND PEDESTRIANS

John J. Saia, Woodstock, Md.

Application March 20, 1941, Serial No. 384,272

2 Claims. (Cl. 177—329)

This invention relates to electric signaling systems; also, to an illuminated directing indicator for attachment to vehicles, especially to motor-vehicles, but is not to be confused with signals or indicators that direct or indicate the course to be pursued by the vehicle that carries it for its own benefit, and not to benefit pedestrians or other persons using the highways; for its purpose is to suggest the action and inaction of other vehicles and of pedestrians, thereby to guide them for their safety. Therefore I have chosen to entitle or name this invention Guide for public safety of vehicles and pedestrians.

The great need and benefit of this invention was suggested to and impressed upon the inventor by his personal experiences and observations of dangers and mishaps that have actually occurred in his presence, as well as a great many serious and fatal accidents reported in the daily newspapers; that is, a certain class of accidents that occur in consequence of well-intentioned but improper signals to pedestrians and motorists with respect to the passing in front of and by the side of practically any vehicle that may be taken as an example. By way of illustration or example, let us consider vehicle No. 1 waiting for a local highway "Go" signal at a street intersection, vehicle No. 2 in rear of No. 1 and in readiness to pass when the local highway "Go" signal of the street intersection is given, and a pedestrian desiring to cross or attempting to cross in front of these vehicles: Now, in courtesy and consideration for the pedestrian, the driver of No. 1 vehicle invites or beckons the pedestrian to cross or pass over; but the driver of No. 2, watching the local highway "Go" signal of the street intersection and failing to see the pedestrian in front of No. 1, passes No. 1 just as the pedestrian steps from in front of No. 1, and just at the proper instant to strike the pedestrian who was oblivious of the presence and approach of No. 2. Such mishap might have been avoided with the present invention on the No. 1 vehicle; for its "Pass" signal at the front, for the pedestrian, and its "Caution" signal or "Danger" signal, at the rear, for the driver of No. 2, operate simultaneously or in unison; so No. 2, being warned or repelled by No. 1, would wait until the pedestrian has passed out of its path.

Using another example: Assume that vehicle No. 1 is traveling in front of No. 2, and its driver sees some obstacle or obstruction or potential danger that is not seen by the driver of No. 2, in the immediate rear; and No. 2 sounds its signal of intention to pass No. 1; but No. 1 has no way of informing No. 2 of the danger, so No. 2 passes by No. 1 and collides with the obstacle or obstruction, thus meeting disaster and probably involving some other person or persons in disaster. If No. 1 vehicle had been equipped with combined front and rear inviting or repelling signals, the No. 1 driver seeing the obstacle or obstruction, would have signaled to the driver of No. 2, for "Caution" or "Potential danger," and after passing the obstruction, in any emergency of this manner, would have signal "Pass," to which primarily the signal basic is for the driver of No. 2, thereby, in either case, avoiding probably a multi-vehicle crash.

From the roots of knowledge gained from accidents, near-accidents and potential accidents observed on streets and other highways, I have conceived, invented and developed a combination of two interconnected or interconnectable safety guiding devices attached or attachable on any kind of road-vehicle, at conspicuous positions. One of these devices is located on the front of the radiator or grille, and the other one is located on the central part of the rear roof or lid of the vehicle's rear compartment, at a lower level than the rear-view window, where it is most conspicuous and is out of the lines of vision through the rear-view window.

For large vans, trucks and trailers of the type that have an over-all canopy or body-cover, the rear safety signaling device can be attached on the top of the canopy.

For the trucks and trailers that have open or staked bodies, the rear safety-guiding or signaling device can be mounted under the rear end of the bed or body.

Therefore, one object of this invention is to provide, as an attachment for vehicles, an electric signaling combination that includes a front signal and a rear signal both electrically connected with a selective switch mechanism whereby a driver of the vehicle can simultaneously instruct a person in front of his vehicle and a person or vehicle-operator behind his vehicle as to the course of action or/and inaction they are invited to pursue for avoiding collision with one another.

Another object of this invention is to provide such electric signaling combination that has easily adjustable attaching means that permit it to be secured, in effective working position, on any one of a large variety of motor-vehicles and other road-vehicles, by any person of ordinary mechanical ability; and which, when so attached, is visible to pedestrians and motorists from any point within a range of more than 180 degrees.

Another object is to provide the signaling combination with very simple and generally recognized signals that will be readily understod by young and old persons of any degree of common sense or natural instinct, without the necessity of being instructed as to the meaning of the respective signals.

Another object is to supplement the visible word "Pass" or "Go," or the like, with a surrounding diffused or distributed light that attracts attention to the word-signal without detracting from its prominence or conspicuousness.

Another object is to supplement the red repelling signal-elements with flickering lamps so as to render them very conspicuous and thus maximize their effectiveness as signals of "Caution," "Danger" and "Potential danger."

Another object is to provide a signaling device, of this character, having its lamps and all other interior parts and surfaces sealed against the entrance of moisture, dust, etc., so that the maximum efficiency is preserved, and so that the necessity for cleaning the interior and internal parts is eliminated; and a further object is to provide the lamp-container with a removable front wall or translucent face-plate for gaining easy and quick access to the interior of the lamp-chamber or lamp-socket-chamber or terminal junction-box for exchanging new lamps for old ones, and for making the proper electric connections, etc.

Another object is to form the base of each front and rear signaling unit mainly or entirely of metal, all parts electrically connected together and adapted to be electrically connected directly on the vehicle so as to form a ground-circuit for all the lamps and battery or source of electric current; thereby eliminating expense of installing insulation; also minimizing resistance and maximizing efficiency.

Another object is to gain access to the outer lamp-chamber through the inner chamber that contains the lamp-sockets and wiring terminals; so the outer chamber need not be uncovered or disturbed when removing and replacing lamps of the outer chamber.

Another object is to provide alphabetic indicia adjacent to the respective terminal-connectors of the selective switch unit, and adjacent to the binding posts within the respective front and rear signaling units, so that any person having ordinary knowledge can make proper electrical connections without specific instructions.

Another object is to provide an improved form or type of supplemental or extension lamp-socket to be removably and exchangeably connected to the fixed lamp-sockets of the lamp-socket-chamber or junction box, and which normally extend from the lamp-socket-chamber into the respective lamp-chambers and support the respective lamps in the latter.

Another object is to provide an improved form of selective switch-housing that includes an indexing ridge between the front and rear push-buttons, so the user's hand is instinctively guided thereby to the respective front or lower push-button or press-button without need for the exercise of the eyes for very quickly finding and pushing the intended push-button.

Another object is to provide an improved form of folding anchor-bolt whereby the front signaling unit can be secured on the various forms of grilles of motor-vehicles, by inserting the folded fasteners or cross-bar keys between adjacent grille-bars, then unfolding the fasteners, then manipulating the fasteners so their cross-bars engage with two or more of the grille-bars in the proper relation to securely attach the signaling device to the radiator-grille and at the elevation desired or permitted.

Other objects and important features are pointed out or implied in the following details of description, in connection with the accompanying drawings in which:

Fig. 3 is a rear-end view or elevation of an ordinary or conventional form of motor-vehicle having the rear signaling unit of my invention attached thereto in the effective position, viz., in an unobstructed view of persons at the rear or at either side of the rear end of the vehicle, the size of the signaling device being greatly exaggerated in proportion to the size of the vehicle.

Fig. 4 is a perspective view of the rear signaling unit detached, as seen from a view-point in rear of and above the said unit.

Fig. 5 is a detail-assembly view of the metallic portions of the rear signalling unit tilted at a considerable angle toward the observer, and in section along the line 5—5 of Fig. 6, the translucent parts being omitted.

Fig. 6 is a vertical sectional view taken along the line 6—6 of Fig. 5; but also showing the translucent parts in normal position; this view also showing a portion of the rear end of the vehicle, and the adjustable attaching means secured on the latter and holding the rear signaling unit in its upright position or proper adjustment.

Fig. 7 is a detail-assembly view of the sheet-metal parts of the front signaling unit of my invention, as viewed from the upper front, or as viewed from the front when tilted forward, the translucent parts being omitted.

Fig. 8 is a detail-assembly view in central vertical section, showing the interior of one of the opaque tubular chambers that constitute combinations of lamp-socket and lamp-chamber; also the interior of an attached elongated lamp-socket or lamp carrier having a two-filament lamp therein and electrically connected thereto.

Fig. 9 is a horizontal sectional view taken along the line 9—9 of Fig. 8.

Fig. 10 is a horizontal sectional view taken along the line 10—10 of Fig. 8.

Fig. 11 is a sectional perspective view of the selective switch-mechanism or unit for effecting illumination of the front and rear signaling units, the section being taken along the left side.

Fig. 12 is a central vertical sectional view of the combined tubular bolt and conducting wire conduit, as shown in Fig. 6, except being enlarged and having additional adjuncts.

Fig. 13 is a diagrammatic view of the entire signaling system, showing the front push-button or press-button pressed for closing the circuit through all the lamps except the front warning-lamps or caution-lamps and the rear pass-lamps; the dot-and-dash lines indicating temporarily dead wires.

Fig. 14 is a diagrammatic view similar to Fig. 13, but showing the rear push-button or press-button pressed for closing the circuit with all the lamps except the rear warning-lamps or caution-lamps and the front pass-lamps, the dot-and-dash lines indicating temporarily dead conducting wires.

Fig. 15 is a perspective view of a special form of anchoring or securing device for insertion between adjacent grille-bars, and engaging with the grille-bars for securing the front signaling unit in the grille of a motor-vehicle.

Fig. 16 is a view of the device shown in Fig. 15, but folded.

Referring to these drawings in detail, wherein similar reference letters and numerals refer to similar parts in the several views, the invention is described in detail as follows:

Figure 1:
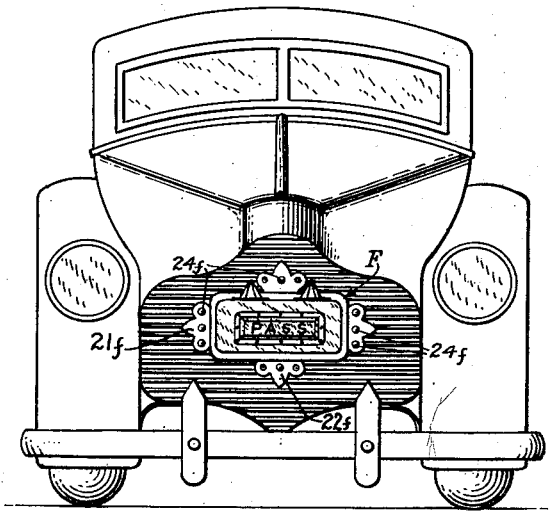
Fig. 1 is a front elevation of an ordinary or conventional form of automobile or motor-vehicle having the front signaling unit of my invention secured on its grille in the effective position, viz., in unobstructed view of persons in front of or at right or left of the grille, the size of the signaling device being greatly exaggerated in proportion to the size of the vehicle.

In Figs. 1, 2, 13 and 14, the front signaling unit is shown at the reference-letter F; and in Figs. 3, 4, 6, 13 and 14, the rear signaling unit is shown at the reference-letter R; and in Fig. 11, the selective switch-unit is shown at S, its bracket being shown at 54.

Inasmuch as the construction and arrangement of each unit F and R are substantially the same, the detailed description of one applies alike to the other except as to a few details; and here it should be understood that the letters "L" and "D," in Figs. 13 and 14, mean respectively "light" and "dark," and are not intended as reference characters; also, that the letters "F" and "R" that are incorporated in Figs. 13 and 14 and on the face of Fig. 11 are not to be confused with reference characters, being features of the invention, as is also true of the printed words in Figs. 1, 2, 3, 4, 5, 7, 11, and abbreviations in Figs. 13 and 14, except those explanatory words on the fingers that hold the push-buttons depressed.

The concavity of the front base-plate 20f differs from the rear base-plate 20r which is plane instead of concaved. The concavity of 20f provides for conformance to the usual forward bulge of the grille of a motor-vehicle. The securing strips that comprise ears 21r and 22r are preferably removably secured to the base-plate 20r for convenience in installing the rear signaling unit on the part VR or roof-plate of the vehicle; and the ears 22r are preferably hinged on the main parts of these strips for easy adjustment and conformity to the part VR where it is secured at 23r by a bolt or other securing means. A beam 24r (Figs. 5 and 6) is united with the upper ends of strips that comprise the ears 21r, and also united with a strip 25r that includes a hinge 26r and is slotted at 27r and apertured at 28r, a complemental strip 29r is slotted at 30r and apertured at 31r and hinge-jointed at 32r so its lower end-portion or hinge-element 33r is flexible and easily conformable to the part VR where a tubular bolt 34r passes therethrough and through the part VR for securing these parts together and providing a conduit for the conducting wire 35r (Figs. 6, 13 and 14) and for conducting wire 36r omitted from Fig. 6, but seen in Figs. 12, 13 and 14. It is to be seen that the hinge-jointed strips 25r and 29r are longitudinally adjustable, and that the screws in apertures 28r and 31r, when tightened, secure them in any desired adjusted position for maintaining the rear signaling unit in the upright position shown or in any desired upright position.

The securing ears 21f and 22f, of the base-plate 20f, are not only provided with apertures 23f to receive securing bolts 24f (Figs. 1, 15 and 16), but are perforated or otherwise made flexible at 25f for ready conformity to the shapes of grilles of different designs or types.

The front junction-box or terminal-chamber 37f and rear junction box or terminal-chamber 37r differ only in shape, and that only slightly different, in respect to the curvature of the base-plate 20f whose central portion forms or constitutes the rear wall of the chamber, while the corresponding part of the terminal-chamber 37r is plane.

Each rear wall of the chambers 37r and 37f, being of sheet metal, hence electrically conductive, is apertured for receiving apertured insulators 38 tightly fitted therein and having conducting studs or terminal connections extending therethrough in air-tight and dust-excluding relation; these are respectively shown at 39f—1, 39f—2, 39r—1 and 39r—2, for the sake of ease in tracing the circuits, but the letters "R" and "F," adjacent to the respective terminal connections, are for guiding the constructor or user to the proper ones respectively for connecting thereto the proper conducting wires respectively to produce the intended and desired results in cooperation with correlated features presently to be described, and here it should be understood that the wires 35r and 36r (Figs. 12, 13 and 14) are connected to the outer ends of terminal connections 39r—1 and 39r—2, while the inner ends of these terminal connections or binding posts are reserved for connections of several lamp-conductors, as presently described. Likewise, it should be understood that wires 35f and 36f are connected to the outer ends of terminal connections 39f—1 and 39f—2 respectively, while the inner ends of these latter connections are reserved for connections of several lamp-conductors of the front signaling unit. In practice, the wires 35f and 35r may be united as a single wire "(1)" having its opposite ends connected respectively to terminal connections 39f—1 and 39r—1, of the front and rear signaling units; and the wires 36f and 36r may be united as a single wire "(2)" having its ends connected respectively to the terminal connections 39f—2 and 39r—2 of the front and rear signaling units. To these united wires "(1)" and "(2)" are connected a novel selective switch-mechanism 40 through the medium of wires 41 and 42 respectively.

The switch-mechanism 40 includes an insulating base 43 that has a large cavity in its upper side, and in such cavity are seated a central conducting block 44 to which is secured the middle part of a dual spring-contact or strip 45 whose ends are normally out of contact with switch-contacts 46 and 47 to which the wires 41 and 42 are respectively connected. A wire 48 is electrically connected to the switch-contact 45 through the medium of the block 44. This wire 48 connects to one terminal of a battery 49, and the other terminal of this battery is grounded to the plates 20f and 20r; and though the diagrammatic views 13 and 14 show a wire G that terminates in the grounds at g—g, it is intended, in practice, that the battery be grounded direct to the metal body of the automobile or other vehicle that carries these signaling devices, and that the plates 20f and 20r are electrically connected with said metal body through the mediums of their respective attaching elements that are previously described. The switch mechanism also includes an apertured face-plate 50 through whose apertures extend push-buttons 51 and 52 held normally protruding by the spring-contact 45. A ridge 53, across the face of the switch-mechanism or unit 40, serves as a guide for the hand of the operator to instinctively locate the respective push-buttons 51 and 52 as positively as his hand is guided by instinct or practice in operating the shifting gear lever of his motor-vehicle; so, his hand goes instinctively to the intended push-button and presses it and keeps it pressed as long as he wishes the signal of caution to remain effective. The large letters "F" and "R," on the face of the switch-unit, also serve as guides for the hand of the operator, as well as for his mind, for practically, without written or printed instructions, the operator will know that "F" stands for "front" and "R" stands for "rear," especially so because the letter "F" is on the front part of the duplex switch mechanism, and the letter "R" is on the rear part of the duplex switch mechanism; for of course he is made to understand that the main purpose of this safety system is to guide and warn and thus protect pedestrians and other users of the highways from potential and imminent dangers; and it is also intended that the general adoption and use of these public safety signaling devices will cause a larger number of vehicle operators to have more personal pride in showing courtesy and consideration as to safety of pedestrians and others who use the public and private highways, thus to very greatly reduce the number of traffic accidents by simultaneously giving right of way to such users of the highways at one position while flashing a warning signal in front of one or more vehicle operators at one or more positions of potential danger. It is shown, therefore, that any two or more potential danger points can be separated, or kept from colliding, by the proper use of my invention, because of the fact that such danger-points are respectively in front of and in rear of the front and rear signaling devices which are facing respectively forward and rearward while flashing a warning or caution signal to the occupant or occupants of either the front or the rear danger point and while giving right of way to the occupant or occupants of the danger point not so warned. Now assuming that a person or persons in front of the operator appears to wish to pass over, or cross in front of the operator's standing vehicle, the operator presses the button near "F" to give such person or persons the signal or invitation to "Pass," and at the same time automatically flashes a warning or repelling signal to any vehicle driver that may be in rear so as to avoid collision of the vehicle in rear and the person or persons in front. Or, in cases where the driver, using this signalling device, gives a rearward driver the "Pass" or invitation signal, by pressing the rear push-button (at "R"), he simultaneously and automatically gives the warning or repelling signal at the front for observance by any person, driver or pedestrian, that there is imminent danger to be avoided.

To prevent any confusion or misunderstanding in operating this switch-unit, the word "Pass" is provided adjacent to each push-button, and such word "Pass" correlated with the letter "F" and the adjacent push-button, could hardly be mistaken to mean anything other than that this push-button is to be pushed or pressed when desired to indicate to a person in front of or forward of the operator that such person is given the right of way for passing across in front of the operator; and likewise, the word "Pass" correlated with the letter "R" and the push-button therebetween, could mean nothing other than that this rear push-button is to be pushed or pressed when the operator desires to give the right or signal to "overtake" or pass forward by and beyond the operator of this signaling system.

A specially designed bracket or support 54 is united with the selective switch mechanism and constitutes a part of the switch-unit. As here illustrated, this bracket is an extension of the sheet metal face-element 50; but the invention is not limited to this specific construction. Apertures 55, in the bracket 54, are for receiving screws or bolts for securing the switch-unit to the dash-board or instrument-board of a vehicle. The slant of the face 50 from front to rear accommodates it to the ready and quick perception of the vehicle operator.

Figure 2:
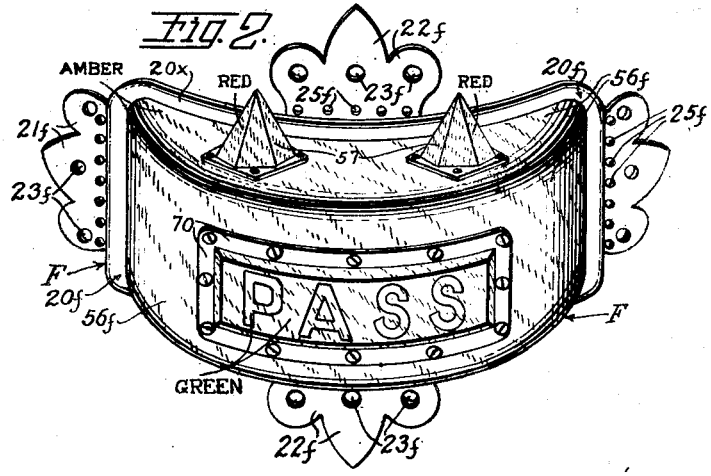
Fig. 2 is an enlarged perspective view of the front signaling unit detached, as seen from a view-point in front of and above the said unit.

Referring now especially to Figs. 2, 4 and 6, it will be seen that the metallic chamber 37r is entirely enclosed within a translucent hood or light-chamber 56r that is secured to the metal plate or sheet 20r by means of an endless flange 20x that is substantially the same as the one on the plate 20f of the front signaling device or unit; but the light-chamber or lamp-chamber of the front signaling unit is designated by reference character 56f, though it differs from the element 56r only in shape or design. Each of these hoods or light-chambers has a relatively large opening in its upright face and two relatively small openings in its horizontal upper face, the latter being permanently closed by translucent caps or warning-signal-elements 57 which are here shown as of pyramidal form; though the invention is not restricted to this form; and these caps are preferably hollow, though not essentially so. The under side of each cap 57 communicates with the interior of the combined lamp-receptacle and junction box 37f or 37r through the medium of one of the warning-lamp-chambers 58 which, as shown in Fig. 8, extends through an opening 37 in the upper wall or roof 37u of the junction box, while its upper end adjoins the inner surface of the roof of the translucent element 56f or 56r and is preferably secured to the latter by means of screws or other securing means in its apertured flange 58a. The diametrically reduced lower portion of each chamber 58 has therein bayonet slots 58b for engagement with studs in a flange of an interchangeable lamp-socket 59 such as is designed for receiving and combining with a two-filament lamp 60, such as shown in Fig. 8, or with one-filament lamps, such as indicated at 61 in Figs. 13 and 14. Each lamp 61 and its superposed translucent cap 57 constitutes a warning-signal or imminent-danger-signal; and to make them most effective, each cap 57 is red, and each lamp 61 is of the flickering type, unless the user prefers that one lamp 61 of each pair be steady while the other flickers so long as the user or operator keeps the proper push-button, 51 or 52, pressed and closing the circuit through the lamps 61 and 60 of either the front or rear warning-signals.

Since the effectiveness of any signal depends on its attractability and distinctiveness, I have chosen to provide in each signaling unit, front and rear, a combination of illuminated colors; and though I have chosen to use only the three colors that have become publicly and generally recognized and understood as to their respective meanings, viz., red, for warning of danger and for stop; amber, for caution and for penetration of fog etc.; and green, for proceed or for all clear; I provide a novel and useful combination of these colors, as indicated by the printed words "Red," "Amber" and "Green," attached by leadlines to Figs. 2 and 4; it being understood that these same colors apply to the same parts in all views of the drawings. Here, it should be understood that all these different colored elements 56f, 56r, 57 and the pass-signal-element 62 are translucent; also, that the translucent amber-colored elements 56f and 56r are both invariably illuminated as soon as and as long as either pushbutton is pressed to its circuit-closing position; so now attention is directed to Figs. 5, 6 and 7 wherein are shown not only the lamp-socket connections 58b, but also tubular connections or lamp-socket-elements 63, 64, similar to the lower end of lamp-socket-element 58 of Fig. 8, and a dual lamp-socket-element 66, the latter being united with the floor of the junction box, the same for front and rear signaling units F and R. Now, in reference to the socket-element 66, it is intended to hold and electrically connect lamps 67 (Figs. 13 and 14), these being the only ones whose bulbs are within the junction boxes of the front and rear signaling units, and one of these lamps of each pair preferably burns or glows steadily, while the other one flickers when their conductors are energized; so, as they shine through the green translucent closure 62 of the junction-box that contains them, the flickering lamp attracts atention of near-by persons, while the steady lamp keeps the sign "Pass" illuminated, and the green closure 62 transforms the color of the light from the lamps to green; so these lamps 67, when illuminating the green translucent closure or front cover of the junction-box, combine with the element 62 for constituting the pass-signal or all-clear signal.

Just as the tubular socket-elements (front and rear) extend through the upper plates or top covers of the chambers 37f and 37r, so, the lamp-socket-elements 64 extend through the right and left walls; so lamp-sockets such as or similar to the one shown in Fig. 8, at 59, can be inserted through these elements 63 and 64, secured therein, and retained and supported in such positions that the lamp 68 (Figs. 13 and 14) is in the space between the roof of the element 56f or 56r and the junction-box; and the lamps 69 are respectively in the spaces between the right and left ends of the translucent element 56f or 56r and the respective junction boxes. Therefore, the spaces around the respective junction boxes and within the main translucent chambers 56f and 56r may be correctly termed the main or relatively large light-chambers, and because of the walls and roof of each hood 56f and 56r being relatively thick and of amber color, it diffuses the light from the lamps therein and serves as a softly luminous base or back-ground for the brighter lights of red and green, thus accentuating the visual effect of the warning signals and the "pass"-signals.

The front cap, closure or cover has thereon the word "Pass," the letters of which are preferably protruding (see Fig. 6) for emphasizing or amplifying the visual effect of the pass-signal. In Figs. 2, 4 and 6, it is seen that an apertured endless strip 70 is seated on a narrow marginal edge of the cap or closure 62, that said marginal edge is seated against an apertured flange 37a or the junction-box, and that screws 37b extend through the strip 70 and are threaded into the flange 37a for removably securing the closure 62 in its normal position. By removing the screws 37b and strip 37a, the closure 62 is freed for easy removal for gaining access to the interior of junction-box for removing and replacing lamps and for attaching a conducting wire of each lamp to the proper one of the binding posts 38 according to the guiding indicia printed adjacent to each of these binding posts. However, it is unnecessary to make such attachments to the binding posts every time a new lamp is installed, for the respective lamp-wires are electrically connected to the respective lamp-sockets in a well-known manner, for instance as illustrated in Fig. 8 where the wires 71 have each one end connected to an insulating plug 72 in a position to be pushed up into the socket-element 59 until the terminals in the plug 72 electrically connect with conductors 73 that normally contact with the lamp-terminals at 74, whereupon, the circuit is ready to be completed by closing of the proper switch in the switch-unit 40; for it should be understood that a part of the circuit consists of the metal elements 59, 58, 37u and base-plate 20f or 20r to which the battery 49 is grounded; and the same is true with respect to the socket-elements 63, 64 and 66. Therefore, in replacing a lamp, it is only necessary to seat it in the socket 59 while the plug 72 is in place, then seat and secure the socket 59 in the socket-element 58, 63 or 64. The socket 59 has a spring 59s secured to its lower end in a proper position to press against the lower end of the socket-element 58, or against the inner ends of the socket-elements 63 and 64, for yieldingly pressing the studs of the lamp-socket 59 in the closed ends of the bayonet-slots 58b, to prevent accidental displacement and to obviate or eliminate rattling of the adjoining parts.

As shown in Figs. 13 and 14, this invention includes two interrelated electric circuits, each circuit being inclusive of lamps in both front and rear signaling devices or units; and their currents are traced as follows:

The operator, seeing a pedestrian apparently wanting to pass over in front of his standing or moving vehicle, or seeing another vehicle in which the driver desires to pass or turn in front of the standing or moving vehicle, presses the push-button No. 52 (as in Fig. 13), thereby closing the battery-circuit through the wires 42 and 48; so the current from wire 42 divides at "(2)," as indicated by the arrows, and flows to the binding posts 39f—2 and 39r—2; and from 39f—2, the current is distributed to the pass-signal lamps 67, of the front signaling unit only, to one filament of each lamp 68 and 69, and then returns through the metallic plates or elements 37f and 20f to the conducting parts of the vehicle represented by the ground-wire G, and thence back to the battery; and from the binding post 39r—2, the current is distributed to the warning or caution-signal lamps 61 that shine through the red elements 57 of the rear signaling unit only, to one filament of each rear lamp 68 and 69, and then returns through the metallic elements 37r and 20r to the ground-conductor G, and thence to the battery 49; thereby, not only relieving potential or imminent traffic-congestion in front of the operator of this device, but also displaying the warning-signal before the eyes of any driver of a vehicle that may be in rear of the vehicle that has this signaling system thereon.

If the operator of this signaling system hears, from a vehicle in the rear, a signal that indicates that the driver of such rear vehicle wishes to pass forward or "overtake" said operator; and if said operator sees no reason for objecting to such "overtaking," the operator presses the push-button No. 51 (as shown in Fig. 14), thus closing the battery-circuit through the wires 48 and 41; so the current is divided at "(1)," flows forward and rearward (as shown by the arrows) to the binding posts 39f—1 and 39r—1; and from 39r—1, the current is distributed to the rear invitation or pass-signal lamps 67, to one filament of each rear lamp 68 and 69, and returns through the elements 37r and 20r to the ground-conductor G and thence to the battery 49; and the current from binding post 39f—1 is distributed to the front warning-signal lamps 61, to one filament of each front lamp 68 and 69, and returns through the metallic elements 37r—1 and 20r to the ground-conductor G and thence to the battery 49; thereby not only overcoming the long-felt need of a signal on a vehicle ahead, to answer the horn of a vehicle in rear whose operator wishes to "overtake" the vehicle ahead, and to assure the said operator of the fact that there is no danger to be encountered while overtaking the vehicle ahead, such assurance being unmistakable in view of the illuminated word "Pass."

In a previous paragraph, I have assumed two situations in which a signaling system of this kind could have been used to effect safety and convenience of persons in and near the vehicle having this signaling system attached and operated; and I now assume a condition in which there is one or more potential or imminent dangers that are apparent to the driver of machine or vehicle No. 1 that has the signaling system attached, but not apparent to the driver of No. 2 vehicle. The potential danger may be a pedestrian, animal, fowl or other object hidden by the No. 1 vehicle from the driver of No. 2; or the potential danger may be a vehicle about to come into the paths of vehicles Nos. 1 and 2 from behind a bank or other obstructions and seen by driver of No. 1 but not by the driver of No. 2; or the danger might be one or more vehicles visible to the driver of No. 1 from over a hill or around a curve, but not visible to the driver of No. 2 vehicle when he sounds his horn as an indication that he is about to "overtake" No. 1. In such case, the driver of No. 1 vehicle presses button No. 52, thereby giving the warning or repelling signal to the driver of No. 2, and holds the button down until the potential danger is over, then releases button No. 52, and presses button No. 51, thereby giving the No. 2 vehicle the signal to pass. On much-traveled trails and highways, such potential dangers and such "overtake" signals are sounded very many times during a few hours of traveling in motor-vehicles and other vehicles. In fact, the potential dangers here mentioned are only a few of many that are repeatedly encountered by a large majority of motorists; and, for lack of such signaling systems or other means of avoiding such dangers, there occur not only the very many accidents recorded in the daily newspapers, but also a very large number that are never recorded in any paper or police record-book. In fact, many of the major causes of major pile-ups of three or more vehicles is that three or more drivers attempt to occupy the same cross-section of the trail or highway at the same time; yet not intentionally, but for lack of mutual understanding such as can be imparted by even one vehicle equipped with a signaling system such as herein described. If all vehicles were equipped with such signaling systems, the drivers could cooperate by relaying the warning-signal forward and rearward, thereby effecting such mutual understanding that there could be no excuse for any such collision or pile-up as described or assumed in the foregoing.

A very important feature of this invention resides in the fact that each switch of the selective switch-unit automatically opens and breaks the circuit as soon as the operator or driver releases its push-button; so there is no possibility of the respective circuits being inadvertently left closed, thus not only minimizing the use of battery-power, but (of far greater importance) avoiding the continuance of the signaling beyond the period of time intended by the operator; and when this feature is generally known among motorists, the corollary feature is also known, that there is no room for doubt that a potential or imminent danger is seen by the person operating the warning-signal, this in contradistinction to mere "stop" signals that operate automatically on application of a brake for slowing down a vehicle.

Moreover, when the features of this signaling system become familiar to motorists, it will not be necessary for any one of them to be near enough to the pass-sign to read it, for its illuminated amber background, in absence of the illumination of the caution or warning elements 57, will be understood as a signal to pass, also as an indication that a warning signal is displayed to the vehicle or vehicles in rear of the vehicle that displays the pass-signal. Moreover, the amber back-ground is always simultaneously displayed in both front and rear signaling units; and inasmuch as the amber color is generally or universally recognized as a caution-signal, and can be seen in fog, dust, falling snow, etc., more clearly than other signal-lights can be seen, the maximum of safety can be obtained in any of these obscuring conditions, by the operator alternately pressing and releasing one or both of the push-buttons while driving at moderate speed.

Though I have described the elements 56f, 56r, as amber-colored; the elements 57 as red; and the elements 62 as green; it is quite within the scope of this invention to make them entirely of the respective colors mentioned, or to merely provide such elements with translucent linings or coatings of the respective colors; also to merely provide the lamps with bulbs of the respective colors mentioned; so in using the terms amber-colored light-signal, red-light-signal, and green-light-signal, such terms are intended to apply to any of the conditions mentioned in this paragraph; and while it may be most practical to have these elements translucent without being transparent, the term "translucent" is deemed broadly to cover "transparent."

While I have chosen to show the caps 57 of pyramidal and near-conical shape, for sake of novel and distinctive and attractive appearance, as well as for even distribution and diffusion of the red-light-signals, the invention is not confined to the shape shown and described.

For the sake of maximum efficacy in attracting attention to the red-light-signals, their lamps are preferably of the flickering type or kind, the invention is not restricted to lamps of any type or kind other than those that are capable of being lighted by an electric current therethrough.

One very important fact about this safety-guiding signaling system is that its front and rear signaling units are located in such positions on the vehicle, that they do not interfere with or become confused with any other attachments, signals etc., and do not impose any disadvantages, while they provide for numerous advantages not obtainable by any previously known means.

Another very important fact is that both the front and rear signaling units are interrelated and interconnected for simultaneously displaying signals with respect to the same potential danger, viz., a signal or invitation to pass or "overtake," and a repelling signal of caution or warning, so others will not collide with the person or vehicle that has received the signal to pass.

Under previous and present conditions where no vehicle is equipped with one of these signaling systems, the driver of vehicle No. 2 always, yes, always takes a dangerous chance when he starts to pass vehicle No. 1; for when the driver of No. 2 sounds his horn as an indication that he is about to pass, there is no assurance that the driver of No. 1 heard such signal or recognized it as such signal; so, even though the driver of No. 1 vehicle moves to one side, such movement is not necessarily for giving right-of-way, but may be a preliminary to turning across the highway for entering a cross-road or elsewhere; and if the latter is the case when No. 2 tries to pass, there results a collision with these two vehicles and perhaps others that may be near and traveling rapidly. The possession and operation of my signaling system gives evidence to the No. 2 vehicle-driver that his signal is heard and heeded; or if he receives no response from vehicle No. 1, he sounds his horn at moderate intervals until he gets a pass-signal from vehicle No. 1, thereby reducing the danger of "overtaking" to the minimum, especially in view of the fact that a warning-signal is simultaneously displayed in view of operators of all oncoming vehicles that may be near at hand, such display of the warning-signal being automatic in the sense that it is inevitably a corollary of the repelling, inviting or pass-signal; so the pass-signal cannot be displayed at one end of the vehicle without the warning-signal being displayed at the other end of the vehicle.

I do not intend to limit my patent protection to the precise details of construction and arrangement described and shown, for the invention is susceptible of numerous changes within the scope of the inventive ideas as implied and claimed.

I claim the following as my invention:

1. In a signaling system for purposes specified, the combination with a vehicle, of an electric current source within said vehicle, two signaling units attached respectively on the front and rear end-portions of said vehicle, each of said signaling units being inclusive of a normally unilluminated pass-signal-element and a normally unilluminated warning-signal-element, a selective switch mechanism in said vehicle and being normally operable independently of any extrinsic controlling or operating mechanism, electric conductors in said vehicle and electrically connected to said source of electric current and to contacts of said switch-mechanism, said electric conductors being inclusive of lamps which are properly arranged and operable for illuminating the said pass-signal-element and warning-signal-element of each signaling unit, said selective switch-mechanism being operable by an operator in said vehicle so the operator can thereby select and simultaneously operate chosen front and rear ones of said lamps and thereby to illuminate simultaneously the chosen pass-signal-element of one of said signaling units and the chosen warning-signal-element of the other one of said signaling units.

2. The combination defined by claim 1, said selective switch-mechanism being inclusive of two circuit-closing points at said contacts, one of said contacts being electrically connected to lamps of the pass-signal-element of the front signaling unit and to lamps of the warning-signal-element of the rear signaling unit, the other one of said contacts being electrically connected to lamps of the pass-signal-element of the rear signaling unit and to lamps of the warning-signal-element of the front signaling unit.

JOHN J. SAIA.